United States Patent
Liu et al.

(10) Patent No.: US 9,344,402 B2
(45) Date of Patent: May 17, 2016

(54) METHOD, DEVICE, AND SYSTEM FOR AUTOMATICALLY SELECTING IPV6 ADDRESS TRANSMISSION MODE

(71) Applicant: ZTE CORPORATION, Shenzhen, Guangdong (CN)

(72) Inventors: Weipeng Liu, Shenzhen (CN); Yonggang Zhao, Shenzhen (CN); Hailong Wen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/401,991

(22) PCT Filed: Sep. 21, 2012

(86) PCT No.: PCT/CN2012/081726
§ 371 (c)(1),
(2) Date: Apr. 23, 2015

(87) PCT Pub. No.: WO2013/170562
PCT Pub. Date: Nov. 21, 2013

(65) Prior Publication Data
US 2015/0237007 A1 Aug. 20, 2015

(30) Foreign Application Priority Data

May 18, 2012 (CN) .......................... 2012 1 0155224

(51) Int. Cl.
*H04L 12/28* (2006.01)
*H04L 29/12* (2006.01)
*H04W 8/26* (2009.01)

(52) U.S. Cl.
CPC ........ *H04L 61/6059* (2013.01); *H04L 61/2007* (2013.01); *H04W 8/26* (2013.01)

(58) Field of Classification Search
CPC . H04L 61/6059; H04L 61/2007; H04L 12/56; H04L 2012/56; H04L 2012/5667; H04L 49/606; H04W 8/26; H04W 80/04
USPC ......... 370/310.2, 328, 338, 349, 395.52, 389, 370/401, 402
See application file for complete search history.

(56) References Cited

U.S. PATENT DOCUMENTS

| | | |
|---|---|---|
| 2010/0067509 A1 | 3/2010 | Lambert |
| 2011/0103394 A1 | 5/2011 | Vogt et al. |
| 2014/0215087 A1 | 7/2014 | Zhao et al. |

FOREIGN PATENT DOCUMENTS

| | | |
|---|---|---|
| CN | 1809076 | 7/2006 |
| CN | 102340452 | 2/2012 |

OTHER PUBLICATIONS

International Search Report for PCT/CN2012/081726, English translation attached to original, Both completed by the Chinese Patent Office on Jan. 6, 2013, All together 7 Pages.

(Continued)

*Primary Examiner* — Brenda H Pham
(74) *Attorney, Agent, or Firm* — Brooks Kushman P.C.

(57) ABSTRACT

A method, device, and system for automatically selecting an IPv6 address transmission mode are provided. The method includes a Gateway General Packet Radio Service (GPRS) Support Node (GGSN) device adding an identifier of a currently adopted address allocation mode through configuration, and informing it to a mobile terminal; the mobile terminal device obtaining IPv6 address identifier information issued by the GGSN device after completing Packet Data Protocol (PDP) context activation; the mobile terminal device sending a standard router solicitation (RS) message to the GGSN device; the GGSN device attaching the currently adopted address allocation mode when responding with allocated IPv6 address prefix information to the mobile terminal device; and the mobile terminal device analyzing the current address allocation mode sent by the GGSN device, and determining whether the current address allocation mode is to allocate a unique identifier or a unique prefix, and then executing corresponding processing.

7 Claims, 2 Drawing Sheets

(56) References Cited

OTHER PUBLICATIONS

European Search Report for European Application No. EP 12876914.8, Completed by the European Patent Office, Dated Jul. 2, 2015, 7 Pages.

3GPP TS 29.061 V10.3.0 (Jun. 2011), XP 050552938, Jun. 10, 2011, 155 Pages, "3rd Generation Partnership Project; Technical Specification Group Core Network and Terminals; Interworking between the Public Land Mobile Network (PLMN) supporting packet based services and Packet Date Networks (PDN) (Release 10).".

Thomson et al. Network Working Group, Request for Comments: 2462, XP 015008246, Dec. 1998, 26 Pages, "IPv6 Stateless Address Autoconfiguration.".

Park et al. Network Working Group Internet-Draft, Mar. 26, 2005, XP 015038443, 13 Pages, "Considerations on M and O Flags of IPv6 Router Advertisement draft-ietf0ipv6-ra-mo-flags-01.txt.".

METHOD, DEVICE, AND SYSTEM FOR AUTOMATICALLY SELECTING IPV6 ADDRESS TRANSMISSION MODE

CROSS-REFERENCE TO RELATED APPLICATION

This application is the U.S. national phase of PCT Appln. No. PCT/CN2012/081726 filed Sep. 21, 2012 which claims priority to Chinese Application No. 201210155224.0 filed May 18, 2012, the disclosures of which are incorporated in their entirety by reference herein.

TECHNICAL FIELD

The present document relates to the communication technology field, and in particular, to a method, device and system for automatically selecting an IPv6 address transmission mode.

BACKGROUND OF THE RELATED ART

With flourishing development of interconnection network application and high-speed development of information technology, dependency on the Internet of people is greater and greater, followed by fast rising of the mobile communication for recent years at the same time, it results in the rapid increasing of the number of the computers and devices accessing the Internet, and makes the available Internet Protocol (IP) Version 4, IPv4 addresses, on the current Internet face the serious shortage. The Internet Assigned Numbers Authority (IANA) announces on February of 2011 that all IPv4 addresses are already issued to address agencies of every continent, which means that the IPv4 addresses are already exhausted and there is no available address for allocation any more. With the exhaustion of the IPv4 addresses, the IPv6 goes to the center of the stage formally.

In order to answer the problem of IP address exhaustion, various countries in the world launch the work of transiting to the next generation of Internet, and various countries, such as, U.S.A., Europe, Asian-Pacific region, etc., deploy the business development strategy of the Internet Protocol Version 6 (IPv6) one after another, and puts forward the specific requirement for the transition to the IPv6 network. And relevant protocols of the 3rd Generation Partnership Project (3GPP) and the 3rd Generation Partnership Project 2 (3GPP2) propose associated requirements and standards to the IPv6 technology in the communication process long time ago as well. No matter for Universal Mobile Telecommunications System (UMTS) of 3GPP, or for CDMA2000 system of 3GPP2, it is determined that the IPv6 is a development direction of network bearing and service application. Especially in the internet protocol (IP) Multimedia Subsystem (IMS) stage of 3G, the network system will be roundly based on or compatible with IPv6. The IPv6 already becomes a basic protocol shared by the Internet and the mobile communication network, and the mobile IPv6 makes the Internet merge with the mobile communication network, which can provide ubiquitous and "online forever" connection. If the mobile terminal device, such as the mobile phone, the data card, etc., needs to visit the Internet through the IPv6 mode, it is needed to establish the Packet Data Protocol context (PDP context) bearing based on the IPv6 address between the UE and the GGSN through dialing at first; and the Internet can only be visited after the wireless device obtains the IPv6 address and the Domain Name System (DNS) address, and with the 3GPP protocol, the associated standard and procedure are made for the process that the terminal obtains the IPv6 address by dialing.

In the 3GPP protocol, it is pointed out that the IPv6 address is made up of a prefix and an interface identifier, wherein, the high 64-bits is the prefix, and the low 64-bit is the interface identifier. The address allocation process of IPv6, slightly different from that of IPv4, is completed by means of Stateless Address Auto configuration. In the 3GPP norm, the allocations of both the interface identifier and the prefix are completed by two stages by the network; in the first stage, the mobile phone or the data card obtains its interface identifier from the Gateway General Packet Radio Service (GPRS) Support Node (GGSN), and this stage is realized by a process of PDP context activation. The second stage is a signaling stage, wherein the mobile terminal device, such as the mobile phone or the data card, etc., obtains the address prefix required by the global IPv6 address from the GGSN by using the router solicitation (RS) message and the route announcement (RA) message, and the relevant process is shown as in FIG. 1.

Through the above-mentioned two processes, the mobile phone or the data card, etc., utilizes the prefix carried by the route announcement message and the previously received interface identifier to form its own global IPv6 unicast address, and the mobile terminal can utilize the prefix carried by the route announcement message and the locally generated interface identifier to form its own global IPv6 unicast address. In this way, the mobile terminal can use the global IPv6 address and other host computers in the external data network to perform the communication.

While for a terminal device (such as UFI and CPE of ZTE) which can support multiple users to access, this type of device generally will have one wireless wide area network port (WAN port) and a local area network port (LAN port), wherein, the WAN port is connected to the Internet through the wireless technology, such as 2G/3G, and the LAN port provides the network access function for accessing users of the terminal device through a wired or wireless mode. Under the IPv4 mode, the WAN port address is generally an address allocated by the GGSN, and the LAN port address is generally a LAN local address (such as 192.168.0.1); the IP address of the access user terminal is a certain address belonging to a same network segment with the LAN port, and multiple users are interconnected by means of bridge devices. For the LAN port and the WAN port of the device, because the IP addresses are not in the same network segment, the Network Address Translation (NAT) is adopted, and an Intranet IP is converted into an Extranet IP, thus guaranteeing that the access user terminal device can visit the IPv4 network normally.

While under the IPv6 mode, the address of the WAN port is still an address allocated by the GGSN; considering that the NAT destroys the IP end to end communication model and the simple point trouble is easily produced, etc., it is not suggested to use the NAT in default in the IPv6 standard protocol, so the NAT is not continually adopted between the LAN port and the WAN port under normal conditions, while a mode of routing forwarding is preferably to be used. This mode needs to perform special processing on addresses of the WAN port and the LAN port, and the specific implementation can refer to a patent "A method and wireless device for realizing route transmission based on a single IPv6 address prefix" (201110313190.9). The method is to set aside a 126-bit IPv6 address prefix from IPv6 addresses with a 64-bit prefix length allocated by the GGSN, and then allocate an address in the 126-bit prefix to the WAN port, and set the address prefix of the WAN port as 126 at the same time; then take an address different from the WAN port from the residual IPv6 addresses with the 64-bit prefix length to allocate to the LAN port, and then with the stateless address configuration, inform the 64-bit IPv6 prefix of the LAN port to the terminal of the access user by means of route announcement, and construct an intact IPv6 global unicast address by means of EUI-64 according to it, and the IPv6 data between the LAN port and the WAN port are routed and forwarded, thus guaranteeing that the terminal device of the access user can visit the IPv6 network normally.

However, because the IPv6 relevant protocol has a gradual evolution process itself, it leads to that standards for processes of configuring stateless IPv6 addresses of mobile terminal devices in 3GPP protocols of different versions are different from each other. In the 3GPP TS23.060 V5.0.0 or earlier versions, the GGSN device is required to allocate a unique identifier for the terminal device, and meanwhile the terminal must use the unique identifier issued by the GGSN in the IPv6 address configuration process, and the prefix of the IP address is obtained by means of RA; while in the 3GPP TS23.060 V5.1.0 and later versions, the GGSN device is required to allocate a unique prefix for the terminal device, and the terminal device must use the unique prefix issued by the GGSN in the IP address configuration process, and the identifier of the IP address can be obtained by the terminal device itself through issuing by the GGSN or by means of EUI-64. Wherein, the EUI-64 is a 64-bit extended unique identifier, which is generated by the conversion from the MAC address through a particular algorithm.

According to the above-mentioned norms, that is, when the GGSN device adopts the mode of allocating a unique prefix, the address of the IPv6 message sent by the mobile terminal device must use the prefix information allocated by the GGSN, otherwise it can not visit the network normally. In this case, the mobile terminal device only needs to inform the 64-bit prefix information allocated by the GGSN to the access user terminal device with the stateless address configuration technology by means of RA; at the same time, because routing forwarding is adopted between the LAN port and the WAN port, the access user terminal device can visit the IPv6 network normally under that situation. However, when the GGSN device adopts the mode of allocating a unique identifier, the address of the IPv6 message sent by the mobile terminal device must use the identifier information allocated by the GGSN, otherwise it can not visit the network normally. As to a mobile device only allowing one user to access, such as, a traditional or driver-free data card, etc., the particular client can be installed on the access user terminal device, the IPv6 address allocated by the GGSN is obtained through an interface command (ATtention Command, AT) between a data terminal equipment (DTE) and a data communications equipment (DCE) or a Qualcomm Messaging Interface (QMI) between a Qualcomm platform and a terminal device, etc., and then the IP address of the device is set as the same address, and now a MODEM adopts the data bridge mode to transmit transparently the IPv6 data sent by the access user, thus guaranteeing visiting the IPv6 network. But for the terminal device allowing multiple IPv6 user accessing, such as, a portable broadband wireless access device (UFI or MIFI, that is, mini wifi) and a home gateway device (Customer Premise Equipment, CPE), etc., because the routing forwarding mode is adopted between a LAN port and a WAN port, no matter the IPv6 address of the access user terminal device adopts a static or dynamic obtaining mode, it is unable to guarantee that the IPv6 address identifier in the message sent by the mobile terminal device to the GGSN is the same with the one issued by the GGSN, so the mobile terminal device, such as, the UFI, the CPE, etc., cannot work normally under this situation.

In a word, under a relevant technical condition, in order to support different types of the IPv6 address allocation modes of the GGSN, a mobile terminal device needs to determine an IPV6 address allocation mode of an operator before developing and producing in advance, and adopts different IPv6 address transmission modes for different allocation modes; and the terminal device needs to upgrade and replace the version after the allocation mode of the GGSN device is changed. As to a terminal device which can support multiple users to access, such as, the UFI, the CPE, etc., in the situation that the GGSN allocates a unique identifier, the terminal device is unable to support multiple users to simultaneously access and visit the IPv6 network.

SUMMARY OF THE INVENTION

In order to solve the above-mentioned problem, the present document provides a method, device and system for automatically selecting an Internet Protocol Version 6 (IPv6) address transmission mode, which can automatically recognize an IPv6 address allocation mode currently supported by a GGSN device.

A method for automatically selecting an Internet Protocol Version 6 (IPv6) address transmission mode of the present document comprises:

a Gateway General Packet Radio Service (GPRS) Support Node (GGSN) device adding an identifier of a currently adopted address allocation mode through configuration, and informing it to a mobile terminal;

a mobile terminal device obtaining IPv6 address identifier information issued by the GGSN device after completing Packet Data Protocol (PDP) context activation;

the mobile terminal device sending a standard router solicitation (RS) message to the GGSN device; the GGSN device attaching the currently adopted address allocation mode when responding with allocated IPv6 address prefix information to the mobile terminal device; and the mobile terminal device analyzing the current address allocation mode sent by the GGSN device, and determining whether the current address allocation mode is to allocate a unique identifier or a unique prefix, and then executing corresponding processing.

Wherein, the GGSN device adds the identifier of the currently adopted address allocation mode in a route announcement (RA) message.

Wherein, the GGSN device responds with the allocated IPv6 address prefix information by means of the route announcement message, and adds a field of the currently adopted address allocation mode in the route announcement message.

Wherein, executing corresponding processing when determining that a current address allocation mode is to allocate a unique identifier comprises:

the mobile terminal device configuring a local address of a site for a local area network port, and meanwhile informing prefix information of the local address of the site to an access user terminal of the local area network port;

after obtaining the prefix information, the access user terminal device constructing a local address of an IPv6 site and performing an IPv6 communication; and the mobile terminal device converting the local address of the site into a global unicast address allocated by the GGSN by means of NAT66, and forwarding a message to a wireless wide area port, to realize a normal communication of a local message and an extranet message.

In addition, the mobile terminal device informs the prefix information of the local address of the site to the access user terminal of the local area network port by means of a route announcement (RA).

In addition, executing corresponding processing when determining that a current address allocation mode is to allocate a unique prefix comprises:

the mobile terminal device informing the prefix information of the IPv6 global unicast address obtained from the GGSN device to the access user terminal of the local area network port, and meanwhile setting corresponding IPv6 unicast addresses for the local area network port and the wireless wide area network port by means of prefix division;

after obtaining the prefix information, the access user terminal device constructing the IPv6 global unicast address and performing the IPv6 communication; and the mobile terminal device routing and forwarding the IPv6 message of the local area network port to the wireless wide area network port by means of routing forwarding, to realize the normal communication of the local message and the extranet message.

Wherein, the mobile terminal device informs the prefix information of the IPv6 global unicast address obtained from the GGSN device to the access user terminal of the local area network port by means of the route announcement (RA).

A mobile terminal device of the present document comprises a route announcement module and an address allocation mode detection module; wherein, the route announcement module is configured to send a router solicitation (RS) message to a Gateway General Packet Radio Service (GPRS) Support Node (GGSN) device after a Packet Data Protocol (PDP) activation is completed, to obtain prefix information and address configuration information allocated by the GGSN device; and the address allocation mode detection module is configured to analyze a current address allocation mode sent by the GGSN device, and determine whether the current address allocation mode is to allocate a unique identifier or a unique prefix, and inform the determined allocation mode to the route announcement module.

The mobile terminal device of the present document further comprises a message forwarding and processing module, configured to forward and process an IPv6 message flowing through a local area network port and a wireless wide area network port by means of routing forwarding or NAT66; and the address allocation mode detection module is further configured to inform the determined allocation mode to the message forwarding and processing module.

A Gateway General Packet Radio Service (GPRS) Support Node (GGSN) device of the present document is configured to: add an identifier of a currently adopted address allocation mode through configuration, and inform it to a mobile terminal; and add a field of the currently adopted address allocation mode in a route announcement (RA) message when responding with allocated IPv6 address prefix information to a mobile terminal device.

A system for automatically selecting an Internet Protocol Version 6 (IPv6) address transmission mode of the present document comprises a Gateway General Packet Radio Service Support Node (GGSN) device and a mobile terminal device, wherein, the GGSN device is configured to: add an identifier of a currently adopted address allocation mode through configuration, and inform it to the mobile terminal; and add a field of the currently adopted address allocation mode in a route announcement (RA) message when responding with allocated IPv6 address prefix information to the mobile terminal device; and the mobile terminal device is configured to: obtain IPv6 address identifier information issued by the GGSN device after completing Packet Data Protocol (PDP) context activation, and send a standard router solicitation (RS) message to the GGSN device, and analyze the current address allocation mode sent by the GGSN device, and determine whether the current address allocation mode is to allocate a unique identifier or a unique prefix, and then execute corresponding processing.

The beneficial effect of the embodiment of the present document is that, according to the method, device and system for automatically selecting the IPv6 address transmission mode of the present document, the mobile terminal device can automatically recognize the IPv6 address allocation mode currently supported by the GGSN device, and enables the mobile terminal device to select the mode for allocating and constructing the IPv6 global unicast address by itself automatically according to the information at the same time; with the help of the embodiment of the present document, it can be realized that the mobile terminal device can automatically recognize the change and perform the switchover of the IP address allocation mode when the GGSN device upgrades and replaces the IPv6 address allocation mode, and a smooth upgrade is realized without requiring the version replacement; and meanwhile the mobile device supporting multiple users to access, such as, the UFI, the CPE, etc., is enabled to work normally in the situation that the GGSN allocates a unique IPv6 address identifier as well.

PREFERRED EMBODIMENTS OF THE INVENTION

Figure 1:
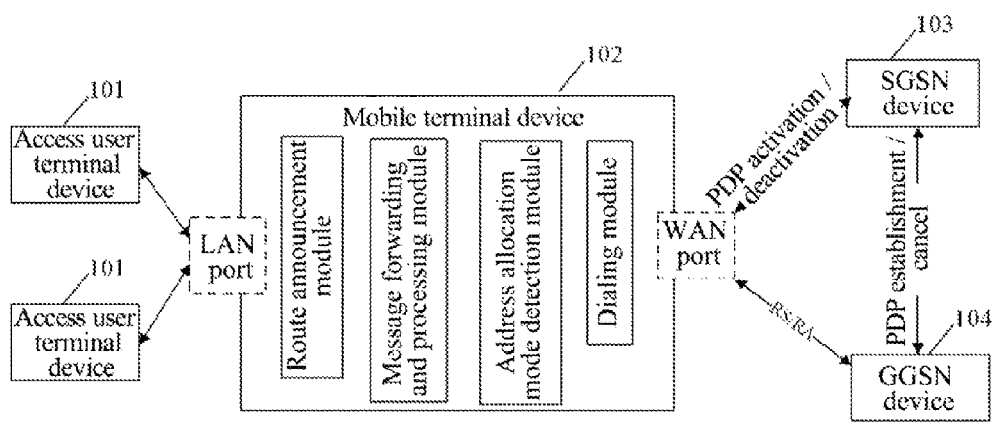
FIG. 1 is a diagram of a system for automatically selecting an Internet Protocol Version 6 (IPv6) address transmission mode of an embodiment of the present document.

The method, device and system for automatically selecting an IPv6 address transmission mode of the present document are described in detail referring to accompanying drawings 1~2 in the following.

The method of the embodiment of the present document is to add an extended attribute field in the route announcement (RA) responded by the GGSN device to the mobile terminal during the process that the mobile terminal device, such as, the mobile phone or the data card, etc., obtains the address prefix required by the global IPv6 address from the GGSN by using the router solicitation (RS) and the route announcement RA during the second signaling stage obtained by the IPv6 address in the dialing process, to identify which kind of address allocation mode is supported by the current GGSN device; in this way, the mobile terminal device can know the address allocation mode adopted by the current GGSN by reading this field after receiving the RA message. When the address allocation mode of the GGSN changes, only the relevant configuration for issuing the RA message in the GGSN device needs to be changed, and there is no need to distribute an extensive version upgrade to the mobile terminal device of the user.

Further, after the mobile terminal device obtains the address allocation mode of the GGSN device, it can hereby recognize the change automatically and select the mode by itself to allocate and construct the IPv6 address automatically.

When the GGSN device adopts a mode of allocating a unique prefix, the mobile terminal device can adopt the stateless address configuration method to inform the obtained 64-bit prefix information of the IPv6 address to the access user terminal by means of the RA, and the access user terminal constructs the IPv6 unicast address for communication according to the EUI-64; when the mobile terminal device is a terminal device supporting multiple IPv6 users to access, such as, the UFI, the PCE, etc., it can adopt the prefix length division in combination with the stateless address allocation mode to construct IPv6 addresses for the WAN port, the LAN port and the access user terminal, and forward the messages between the LAN port and the WAN port by means of routing forwarding, to guarantee that the access user terminal device can visit the IPv6 network normally.

When the GGSN device adopts a mode of allocating a unique identifier, and when the mobile terminal device is a terminal device supporting only one IPv6 user to access, the used IPv6 address is constructed by a way that the access user terminal obtains the address allocated by the mobile terminal device from the GGSN by means of AT or QMI, etc.; when the mobile terminal device is a terminal device supporting multiple IPv6 users to access, because the IPv6 address information of the access user cannot be modified under the routing forwarding mode, in order to enable the access user terminal to visit normally under that mode, certain address conversion needs to be performed. For this purpose, the present document provides a method of using the stateful NAT66 technology to convert the IPv6 address of the access user terminal to an IPv6 address which is the same with the IPv6 address allocated by the GGSN.

In addition, the mobile terminal device sets the IPv6 address of the LAN port as a local IPv6 address of a fixed site according to the configuration information, and meanwhile, by the way of the stateless address configuration, informs the prefix information of the local address of that site to the access user terminal by means of route announcement, and the access user terminal constructs its own IPv6 site address by the way of EUI-64, and uses the address to perform the IPv6 communication. After the mobile terminal device dials and succeeds in obtaining the IPv6 unicast address, the address of the WAN port is set as that address, and the stateful NAT66 function is started at the same time. Through the NAT66 function, the local address of the IPv6 site of the access user terminal can be converted to the IPv6 global unicast address allocated by the GGSN, the realization idea of the NAT66 is basically the same with the realization idea of the IPv4 NAT, in which the address and the port are used to map multiple IPv6 site addresses to a unique extranet IPv6 global unicast address. Thus, the purpose that the device, such as the UFI, the CPE, etc., can visit IPv6 network normally when the GGSN device adopts a mode of allocating a unique identifier, is realized.

The apparatus embodiment FIG. 1 is a diagram of a system for automatically selecting the IPv6 address transmission mode of the embodiment of the present document. As shown in FIG. 1, the system includes an access user terminal device, a mobile terminal device, a GPRS service Support Node device (SGSN device) and a GPRS network gateway Support Node device (GGSN device). Wherein, the access user terminal device 101 is a device connected to the mobile terminal device, which can be a personal computer (PC), a mobile phone, a panel computer (PAD). Because the present document involves the relevant content of the IPv6 address, these connected devices are required to install the IPv6 protocol stack; and meanwhile because the system adopts the stateless address configuration to configure the IPv6 address for the device in default, these devices are required to pre-install the relevant application of the stateless address configuration in advance.

The mobile terminal device 102, referring to the mobile phone, the data card, etc. can move and adopt the wireless protocol, such as, the 2G/3G/4G, etc., to access to the Internet device. This kind of device can provide the access function of the Internet on one hand, and meanwhile can support one or more users to access and visit. In the present document, the mobile terminal device 102 includes a route announcement module, an address allocation mode detection module and a message forwarding and processing module.

Wherein, the route announcement module is configured to send a router solicitation (RS) message to the GGSN device after the PDP activation is completed, to obtain prefix information and address configuration information allocated by the GGSN device; and is configured to allocate IPv6 address prefix information for the user accessing the mobile terminal, and the user accessing the mobile terminal constructs a corresponding IPv6 address according to it.

The address allocation mode detection module is configured to detect and determine the address configuration mode obtained by the route announcement module from the GGSN device, and inform the determined allocation mode to the message forwarding and processing module and the route announcement module.

The message forwarding and processing module is configured to forward and process the IPv6 message flowing through the LAN port and the WAN port by means of routing forwarding or NAT66, etc.

The SGSN device 103 is an important constituent part of the WCDMA core network packet domain devices, and mainly performs routing forwarding, Mobility Management, PDP conversation management, etc for data packets. The SGSN in the present document can be realized with the related art, therefore, and it will not be described in detail in the present document any more.

The GGSN device 104, that is, the GPRS Gateway Support Node, can be connected to various different data networks, mainly plays a role of gateway, can perform protocol conversion on the GPRS packet data in GSM. The present document needs to modify the stateless address configuration part in the GGSN device, to make it support adding the current address allocation mode of the GGSN device into the RA route announcement message.

Figure 2:
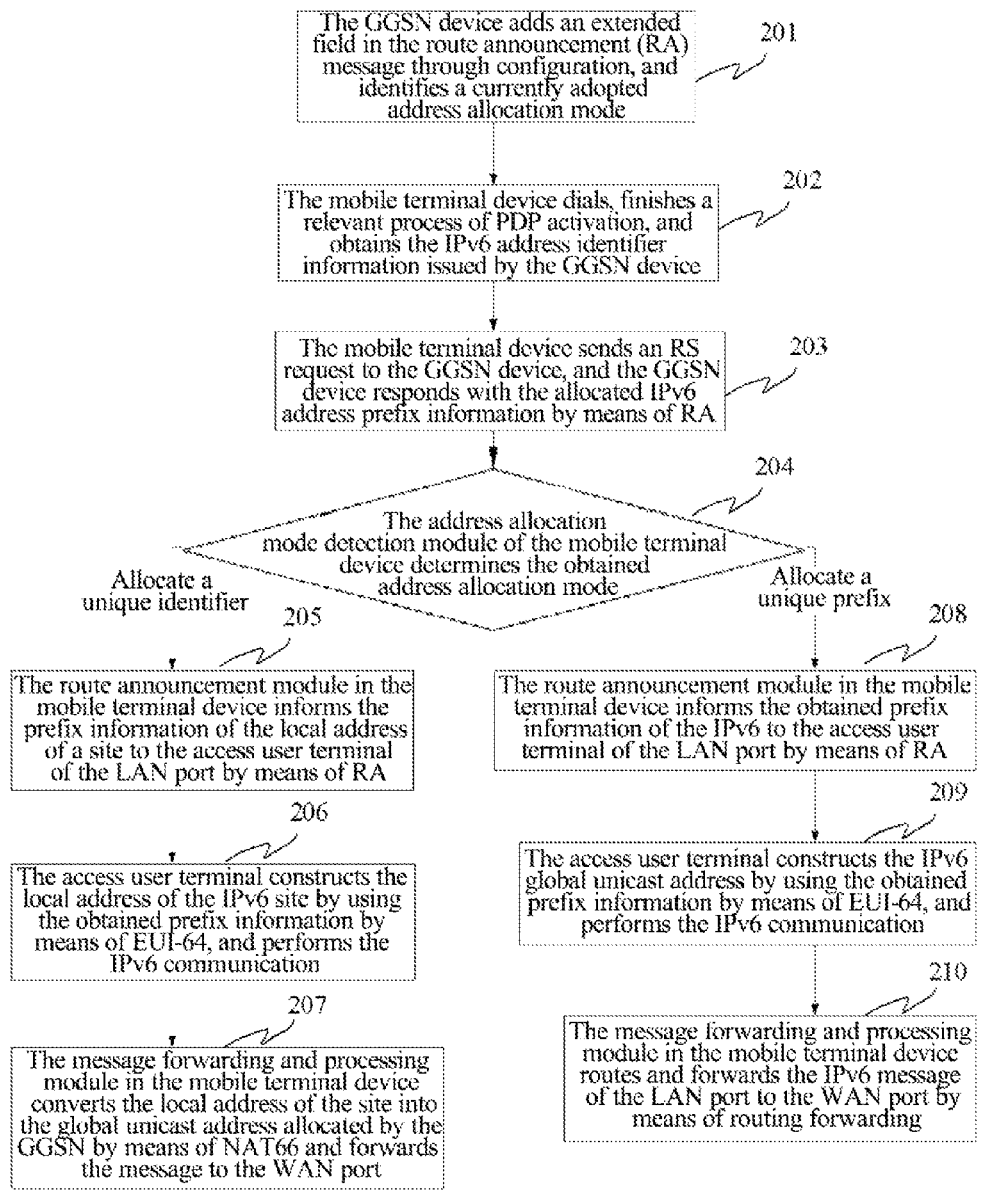
FIG. 2 is a flow chart of a method for automatically selecting an Internet Protocol Version 6 (IPv6) address transmission mode related to an embodiment of the present document.

The method embodiment:

FIG. 2 is the flow chart of the method for automatically selecting the IPv6 address transmission mode involved by the present document. As shown in FIG. 2, the method includes the following steps.

In step 201, the GGSN device modifies a stateless address configuration part, supports to add an extended field in a route announcement (RA) message through configuration, identifies a currently adopted address allocation mode, and informs the information to the mobile terminal.

In step 202, the mobile terminal device dials, interacts with the SGSN device, finishes a relevant process of PDP activation, and obtains the IPv6 address identifier information issued by the GGSN device finally.

In step 203, the route announcement module of the mobile terminal device sends a standard RS request to the GGSN device, and the GGSN device responds with the allocated IPv6 address prefix information by means of RA, and adds a field of the currently adopted address allocation mode in the route announcement (RA) message.

In step 204, the address allocation mode detection module of the mobile terminal device analyzes and determines the field of the current address allocation mode obtained from the route announcement (RA) message; when the current address allocation mode is to allocate the unique identifier, then step 205 is executed; and when the current address allocation mode is to allocate the unique prefix, then step 208 is executed.

In step 205, the route announcement module in the mobile terminal device configures the local address of a site for the LAN port, and meanwhile informs the prefix information of the local address of that site to the access user terminal of the LAN port by means of route announcement (RA).

In step 206, after obtaining the prefix information of the RA announcement, the access user terminal device constructs the local address of the IPv6 site by means of EUI-64, and performs the IPv6 communication.

In step 207, the message forwarding and processing module in the mobile terminal device converts the local address of the site into the global unicast address allocated by the GGSN by means of NAT66 and forwards the message to the WAN port, to realize the normal communication of the local message and the extranet message.

In step 208, the route announcement module in the mobile terminal device informs the prefix information of the IPv6 global unicast address obtained from the GGSN device to the access user terminal of the LAN port by means of route announcement (RA), and meanwhile sets the corresponding IPv6 unicast address for the LAN port and the WAN port by means of prefix division.

In step 209, after obtaining the prefix information of the RA announcement, the access user terminal device constructs the IPv6 global unicast address by means of EUI-64, and performs the IPv6 communication.

In step 210, the message forwarding and processing module in the mobile terminal device routes and forwards the IPv6 message of the LAN port to the WAN port by means of routing forwarding, to realize the normal communication of the local message and the extranet message.

In sum, according to the method, device and system for automatically selecting the IPv6 address transmission mode of the present document, the mobile terminal device can automatically recognize the IPv6 address allocation mode currently supported by the GGSN device, and enables the mobile terminal device to select the mode for allocating and constructing the IPv6 global unicast address by itself automatically according to the information at the same time; with the help of the embodiment of the present document, it can be realized that the mobile terminal device can automatically recognize the change and perform the switchover of the IP address allocation mode when the GGSN device upgrades and replaces the IPv6 address allocation mode, and a smooth upgrade is realized without requiring the version replacement; and meanwhile the mobile device supporting multiple users to access, such as, the UFI, the CPE, etc., is enabled to work normally in the situation that the GGSN allocates a unique IPv6 address identifier as well.

The above is the detailed description with respect to the present document so as to make those skill in the art understand the present document, but it can be conceived that other changes and modifications also can be made without departing from the scope covered by the appended claims of the present document, and all the changes and modifications should be embodied in the scope of the present document.

INDUSTRIAL APPLICABILITY

The beneficial effect of the embodiment of the present document is that, according to the method, device and system for automatically selecting the IPv6 address transmission mode of the present document, the mobile terminal device can automatically recognize the IPv6 address allocation mode currently supported by the GGSN device, and enables the mobile terminal device to select the mode for allocating and constructing the IPv6 global unicast address by itself automatically according to the information at the same time; with the help of the embodiment of the present document, it can be realized that the mobile terminal device can automatically recognize the change and perform the switchover of the IP address allocation mode when the GGSN device upgrades and replaces the IPv6 address allocation mode, and a smooth upgrade is realized without requiring the version replacement; and meanwhile the mobile device supporting multiple users to access, such as, the UFI, the CPE, etc., is enabled to work normally in the situation that the GGSN allocates a unique IPv6 address identifier as well.

What we claim is:

1. A method for automatically selecting an Internet Protocol Version 6 (IPv6) address transmission mode, comprising:
a Gateway General Packet Radio Service (GPRS) Support Node (GGSN) device adding a currently adopted address allocation mode through configuration, and informing the allocation mode to a mobile terminal device;
the mobile terminal device obtaining IPv6 address identifier information issued by the GGSN device after completing Packet Data Protocol (PDP) context activation;
the mobile terminal device sending a standard router solicitation (RS) message to the GGSN device; the GGSN device attaching the currently adopted address allocation mode when responding with allocated IPv6 address prefix information to the mobile terminal device; and
the mobile terminal device analyzing the current address allocation mode sent by the GGSN device, and determining whether the current address allocation mode is to allocate a unique identifier or a unique prefix, and then executing corresponding processing; wherein
when determining that the current address allocation mode is to allocate a unique identifier;
the mobile terminal device configuring a local address of a site for a local area network port, and meanwhile informing prefix information of the local address of the site to an access user terminal of the local area network port;
after obtaining the prefix information, the access user terminal device constructing a local address of an IPv6 site, and performing an IPv6 communication; and
the mobile terminal device converting the local address of the site into a global unicast address allocated by the GGSN by means of NAT66 and forwarding a message to a wireless wide area port, to realize a normal communication of a local message and an extranet message; or
when determining that the current address allocation mode is to allocate a unique prefix;
the mobile terminal device informing the prefix information of an IPv6 global unicast address obtained from the GGSN device to an access user terminal device of a local area network port, and meanwhile setting corresponding IPv6 unicast addresses for the local area network port and the wireless wide area network port by means of prefix division;
after obtaining the prefix information, the access user terminal device constructing the IPv6 global unicast address and performing the IPv6 communication; and
the mobile terminal device routing and forwarding the IPv6 message of the local area network port to the wireless wide area network port by means of routing forwarding, to realize the normal communication of the local message and the extranet message.

2. The method according to claim 1, wherein, the GGSN device adds an identifier of the currently adopted address allocation mode in a route announcement (RA) message.

3. The method according to claim 1, wherein, the GGSN device responds with the allocated IPv6 address prefix information by means of the route announcement message, and adds a field of the currently adopted address allocation mode in the route announcement message.

4. The method according to claim 1, wherein, the mobile terminal device informs the prefix information of the local address of the site to the access user terminal of the local area network port by means of the route announcement (RA).

5. The method according to claim 1, wherein, the mobile terminal device informs the prefix information of the IPv6 global unicast address obtained from the GGSN device to the access user terminal of the local area network port by means of the route announcement (RA).

6. A mobile terminal device, comprising a route announcement module, an address allocation mode detection module and a message forwarding and processing module; wherein, the route announcement module is configured to send a router solicitation (RS) message to a Gateway General Packet Radio Service (GPRS) Support Node (GGSN) device after a Packet Data Protocol (PDP) activation is completed, to obtain prefix information and address configuration information allocated by the GGSN device;

the address allocation mode detection module is configured to analyze a current address allocation mode sent by the GGSN device, and determine whether the current address allocation mode is to allocate a unique identifier or a unique prefix, and inform the determined allocation mode to a route announcement module; and the message forwarding and processing module is configured to forward and process an IPv6 message flowing through a local area network port and a wireless wide area network port by means of routing forwarding or NAT66; wherein the address allocation mode detection module is further configured to inform the determined allocation mode to the message forwarding and processing module.

7. A system for automatically selecting an Internet Protocol Version 6 (IPv6) address transmission mode, comprising a Gateway General Packet Radio Service Support Node (GGSN) device and a mobile terminal device, wherein, the GGSN device is configured to: add a currently adopted address allocation mode through configuration, and inform the allocation mode to the mobile terminal; and add a field of the currently adopted address allocation mode in a route announcement (RA) message when responding with allocated IPv6 address prefix information to the mobile terminal device; and the mobile terminal device is configured to: obtain IPv6 address identifier information issued by the GGSN device after completing Packet Data Protocol (PDP) context activation, and send a standard router solicitation (RS) message to the GGSN device, and analyze the current address allocation mode sent by the GGSN device, and determine whether the current address allocation mode is to allocate a unique identifier or a unique prefix, and then execute corresponding processing;

wherein when determining that the current address allocation mode is to allocate a unique identifier;

the mobile terminal device configuring a local address of a site for a local area network port, and meanwhile informing prefix information of the local address of the site to an access user terminal of the local area network port;

after obtaining the prefix information, the access user terminal device constructing a local address of an IPv6 site, and performing an IPv6 communication; and the mobile terminal device converting the local address of the site into a global unicast address allocated by the GGSN by means of NAT66 and forwarding a message to a wireless wide area port, to realize a normal communication of a local message and an extranet message; or when determining that the current address allocation mode is to allocate a unique prefix;

the mobile terminal device informing the prefix information of an IPv6 global unicast address obtained from the GGSN device to an access user terminal device of a local area network port, and meanwhile setting corresponding IPv6 unicast addresses for the local area network port and the wireless wide area network port by means of prefix division;

after obtaining the prefix information, the access user terminal device constructing the IPv6 global unicast address and performing the IPv6 communication; and the mobile terminal device muting and forwarding the IPv6 message of the local area network port to the wireless wide area network port by means of routing forwarding, to realize the normal communication of the local message and the extranet message.

* * * * *